United States Patent
Leete et al.

(10) Patent No.: US 7,028,124 B2
(45) Date of Patent: Apr. 11, 2006

(54) METHOD AND APPARATUS FOR DUAL QUEUE HEAD PROCESSING OF INTERRUPT ENDPOINTS

(75) Inventors: Brian A. Leete, Beaverton, OR (US); John S. Howard, Portland, OR (US); Brad W. Hosler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 09/965,698

(22) Filed: Sep. 26, 2001

(65) Prior Publication Data

US 2003/0061424 A1 Mar. 27, 2003

(51) Int. Cl.
*G06F 13/24* (2006.01)

(52) U.S. Cl. ..................... 710/263; 707/102

(58) Field of Classification Search ........ 707/100–102; 712/32–35; 710/260–266
See application file for complete search history.

(56) References Cited

U.S. PATENT DOCUMENTS

| | | | |
|---|---|---|---|
| 4,785,394 A | 11/1988 | Fischer | |
| 4,792,495 A | 12/1988 | Taniguchi et al. | |
| 4,819,229 A | 4/1989 | Pritty et al. | |
| 5,291,614 A * | 3/1994 | Baker et al. | 712/35 |
| 5,533,204 A | 7/1996 | Tipley | |
| 5,553,310 A | 9/1996 | Taylor et al. | |
| 5,564,114 A | 10/1996 | Popat et al. | |
| 5,594,882 A | 1/1997 | Bell | |
| 5,617,418 A | 4/1997 | Shirani et al. | |
| 5,621,897 A | 4/1997 | Boury et al. | |
| 5,630,174 A | 5/1997 | Stone, III et al. | |
| 5,694,555 A | 12/1997 | Morriss et al. | |
| 5,708,794 A | 1/1998 | Parks et al. | |
| 5,732,244 A | 3/1998 | Gujral | |
| 5,742,847 A | 4/1998 | Knoll et al. | |
| 5,784,581 A | 7/1998 | Hannah | |
| 5,819,111 A | 10/1998 | Davies et al. | |
| 5,832,492 A | 11/1998 | Wooten | |
| 5,838,991 A | 11/1998 | Shipman | |
| 5,870,567 A | 2/1999 | Hausauer et al. | |
| 5,881,255 A | 3/1999 | Kondo et al. | |
| 5,890,015 A | 3/1999 | Garney et al. | |
| 5,915,087 A | 6/1999 | Hammond et al. | |
| 5,933,611 A | 8/1999 | Shakkarwar | |
| 5,936,967 A | 8/1999 | Baldwin et al. | |
| 5,978,878 A | 11/1999 | Lange | |

(Continued)

FOREIGN PATENT DOCUMENTS

JP 09044443 2/1997

(Continued)

OTHER PUBLICATIONS

Intel Corporation, "Enhanced Host Controller Interface Specification for Universal Serial Bus", Revision: 0.95, Nov. 10, 2000.

(Continued)

*Primary Examiner*—Rehana Perveen
*Assistant Examiner*—Clifford Knoll
(74) *Attorney, Agent, or Firm*—Blakely, Sokoloff, Taylor & Zafman LLP

(57) ABSTRACT

A method and apparatus for generating, initializing, and scheduling of two interrupt queue heads to represent a single endpoint are described. In an embodiment, a method includes generating primary and secondary interrupt queue heads to represent a single interrupt endpoint. The method further includes initializing the primary and secondary interrupt queue heads. The method also includes scheduling the primary and secondary queue heads in immediately subsequent frames.

25 Claims, 10 Drawing Sheets

U.S. PATENT DOCUMENTS

| | | |
|---|---|---|
| 6,012,115 A | 1/2000 | Chambers et al. |
| 6,034,950 A | 3/2000 | Sauer et al. |
| 6,046,762 A | 4/2000 | Sonesh et al. |
| 6,067,591 A | 5/2000 | Howard et al. |
| 6,069,872 A | 5/2000 | Bonomi et al. |
| 6,098,134 A | 8/2000 | Michels et al. |
| 6,098,137 A | 8/2000 | Goodrum et al. |
| 6,104,708 A | 8/2000 | Bergamo |
| 6,108,739 A | 8/2000 | James et al. |
| 6,145,039 A | 11/2000 | Ajanovic et al. |
| 6,205,501 B1 | 3/2001 | Brief et al. |
| 6,219,736 B1 | 4/2001 | Klingman |
| 6,243,778 B1 | 6/2001 | Fung et al. |
| 6,266,731 B1 | 7/2001 | Riley et al. |
| 6,272,499 B1 * | 8/2001 | Wooten ............... 707/102 |
| 6,308,215 B1 | 10/2001 | Kolbet et al. |
| 6,353,866 B1 | 3/2002 | Fensore et al. |
| 6,366,590 B1 | 4/2002 | Hu |
| 6,389,029 B1 | 5/2002 | McAlear |
| 6,483,839 B1 * | 11/2002 | Gemar et al. .......... 370/395.42 |
| 6,505,263 B1 | 1/2003 | Larson et al. |
| 6,515,965 B1 | 2/2003 | Hou et al. |
| 6,587,053 B1 | 7/2003 | Lee |
| 6,600,739 B1 | 7/2003 | Evans et al. |
| 6,678,761 B1 | 1/2004 | Garney et al. |
| 6,701,399 B1 * | 3/2004 | Brown ................ 710/114 |
| 6,771,664 B1 | 8/2004 | Garney et al. |
| 6,792,495 B1 | 9/2004 | Garney et al. |
| 6,813,251 B1 | 11/2004 | Garney et al. |
| 6,889,265 B1 | 5/2005 | Garney et al. |
| 2003/0005182 A1 * | 1/2003 | Leete et al. ............... 710/1 |
| 2004/0008684 A1 | 1/2004 | Garney et al. |
| 2004/0268010 A1 | 12/2004 | Garney et al. |

FOREIGN PATENT DOCUMENTS

| | | |
|---|---|---|
| WO | WO 00 49507 A | 8/2000 |
| WO | WO 01 08018 A | 2/2001 |

OTHER PUBLICATIONS

Enhanced Host Controller Interface Specification for Universal Serial Bus dated May 30, 2001, Revision 0.96 rc2, cover pages -iv and pp. 142.

IEEE Standard for a High Performance Serial Bus; IEEE Std 1394-1995; Aug. 30, 1996; cover pages, pp. 19-47.

U.S. Appl. No. 09/361,677, entitled "Transaction Scheduling for a Bus System" by John I. Garney, et al., filed Jul. 27, 1999 ( 44 pages of spec).

U.S. Appl. No. 09/362,991, entitled "Split Transaction Ptorocol for a Bus System" by John I. Garney, et al., filed Jul. 27, 1999 (35 pages of spec).

U.S. Appl. No. 09/461,625, entitled "Tracking Transaction Status for a Bus System Providing Legacy Bus Compatibility" by John I. Garney, et al., filed Dec. 14, 1999 (44 pages of spec).

U.S. Appl. No. 09/473,914, entitled "Transaction Scheduling for a Bus System in a Multiple Speed Environment" by John I. Garney, et al., filed Dec. 28, 1999 (48 pages of spec).

Search Report for PCT/US 02/01556 mailed Aug. 29, 2002, 1 page.

PCI Special Interest Group, "PCI-to-PCI Bridge Architecture Specification, " PCISIG, Rev. 1.1, (Dec. 18, 1998), pp. 11-13 and 19-30.

* cited by examiner

METHOD AND APPARATUS FOR DUAL QUEUE HEAD PROCESSING OF INTERRUPT ENDPOINTS

FIELD OF THE INVENTION

The invention relates to the field of data communication in a digital system. More specifically, the invention relates to methods or protocols for transferring information on a serial bus.

BACKGROUND OF THE INVENTION

The Universal Serial Bus protocol ("USB") provides a standard for communicating with up to 127 devices using a single, standardized communication scheme, and operates under several versions. USB 1.1 is capable of transmission speeds of 1.5 Megabits per second ("Mbps") (a "low-speed" bus) and 12 Mbps (a "full-speed" bus, and together with a low speed bus, a "full-/low-speed" bus). USB 2.0 transmits data at 480 Mbps (a "high-speed" bus), approximately forty times faster than USB 1.1. USB 2.0 defines a multiple speed signaling environment where a single high-speed bus may support one or more full-/low-speed busses through a transaction translator ("TT") in a USB 2.0 hub.

Under this scheme, system software (the "host controller driver" or "HCD") must allocate and manage the bandwidth of the subordinate full-/low-speed busses. The HCD defines a single data structure (an "interrupt queue head" or "IQH") to represent and manage traffic to a particular interrupt endpoint (a transaction between the host and a remote device) behind a given TT. The period of service for each IQH (e.g., 1, 2, 4, 8, 16 . . . 225 Ms) is defined by the pattern of access by system hardware (the "host controller"). Each time the host controller visits an IQH, the host controller may issue another request to the remote device. The HCD controls the host controller's access to an IQH by setting up a tree structure of IQHs (the "interrupt tree") connected to the host controller's frame list. The frame list is a data structure of pointers that direct the host controller to the first work item in the frame's interrupt tree for the current micro-frame, and is accessed by the host controller on a frame-by-frame basis. Because of the difference in speed between the high-speed and full-/low-speed busses, the TT requires multiple transactions on the high-speed bus to complete a single transaction on the full-/low-speed bus. These transactions, depending on the position in the classic frame, may require the host controller to visit an IQH in consecutive millisecond frames. Currently, the only position in the interrupt tree that is accessible from consecutive frames is the position at period one.

When an IQH is promoted to period one, i.e., period promotion, it consumes at least N times more bandwidth than when operating at its normal period (where N is the normal period of the device, typically 8). This increased bandwidth usage limits the number of devices that can operate behind a TT. This can result in common remote devices coupled with the TT, for example, conferencing cameras, speakers, keyboards, and mice, not operating properly.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, host 100 can be located in FIG. 1. However, element numbers are the same for those elements that are the same across different Figures.

In the drawings.

DETAILED DESCRIPTION

A method and apparatus for generating, initializing, and scheduling of two interrupt queue heads to represent a single endpoint are described. In the following description, for purposes of explanation, numerous specific details are set forth in order to provide a thorough understanding of the present invention. It will be evident, however, to one skilled in the art that the present invention may be practiced without these specific details. For example, embodiments of the present invention are described in relation to the USB 2.0 and USB 1.1 standards; however, embodiments of the present invention may be implemented in another serial bus environment.

System Description

Figure 1:
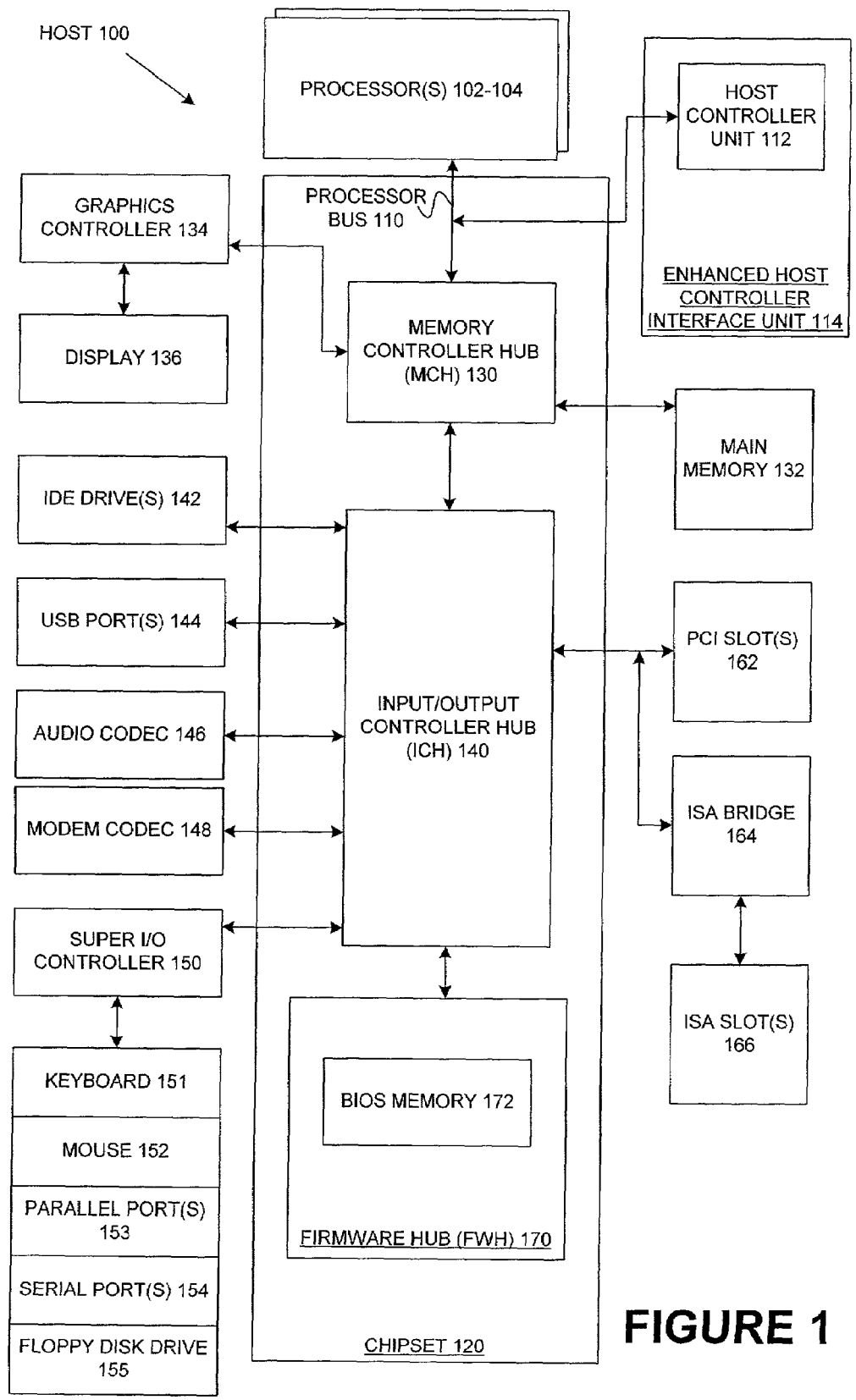
FIG. 1 illustrates an exemplary host 100 comprising processors 102 and 104 for generating, initializing, and scheduling two interrupt queue heads, according to embodiments of the present invention.

FIG. 1 illustrates an exemplary host 100 comprising processors 102 and 104 for generating, initializing, and scheduling two interrupt queue heads, according to embodiments of the present invention. Although described in the context of host 100, the present invention may be implemented in any suitable computer system comprising any suitable one or more integrated circuits.

As illustrated in FIG. 1, computer host 100 comprises processor(s) 102 and 104. Host 100 also includes processor bus 110 and chipset 120. Processor(s) 102 and 104 and chipset 120 are coupled with processor bus 110. Processor(s) 102 and 104 may each comprise any suitable processor architecture and for one embodiment comprise an Intel® Architecture used, for example, in the Pentium® family of processors available from Intel® Corporation of Santa Clara, Calif. In other embodiments, host 100 may comprise one, three, or more processors, any of which may execute a set of instructions that are in accordance with embodiments of the present invention.

Chipset 120 for one embodiment comprises memory controller hub ("MCH") 130, input/output ("I/O") controller hub ("ICH") 140, and firmware hub ("FWH") 170. MCH 130, ICH 140, and FWH 170 may each comprise any suitable circuitry and for one embodiment is each formed as a separate integrated circuit chip. In other embodiments, chipset 120 may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled with processor bus 110 and provides an interface to processor(s) 102 and 104 over processor bus 110. Processor 102(s) and/or 104 may alternatively be combined with MCH 130 to form a single chip. In one embodiment, MCH 130 also provides an interface to main memory 132 and graphics controller 134, each of which are coupled with MCH 130. Main memory 132 stores data and/or instructions, for example, for host 100 and may comprise any suitable memory, for example, a dynamic random access memory ("DRAM"). Graphics controller 134 controls the display of information on display 136, for example, a cathode ray tube ("CRT") or liquid crystal display ("LCD") coupled with graphics controller 134. MCH 130 for one embodiment interfaces with graphics controller 134 through an accelerated graphics port ("AGP"). Graphics controller 134 for one embodiment may alternatively be combined with MCH 130 to form a single chip.

MCH 130 is also coupled with ICH 140 to provide access to ICH 140 through a hub interface. ICH 140 provides an interface to I/O devices or peripheral components for host 100. ICH 140 may comprise any suitable interface controllers to provide for any suitable communication link to MCH 130 and/or to any suitable device or component in communication with ICH 140. ICH 140 for one embodiment provides suitable arbitration and buffering for each interface.

For one embodiment, ICH 140 provides an interface to one or more suitable integrated drive electronics ("IDE") drive(s) 142, for example, a hard disk drive ("HDD") or compact disc read only memory ("CD ROM") drive, to store data and/or instructions one or more suitable universal serial bus ("USB") devices through one or more USB port(s) 144, audio coder/decoder ("codec") 146, or modem codec 148. In one embodiment, ICH 140 also provides an interface through super I/O controller 150 to keyboard 151, mouse 152, one or more suitable devices, for example, a printer, through one or more parallel ports(s) 153, one or more suitable devices through one or more serial port(s) 154, and floppy disk drive 155. ICH 140 for one embodiment further provides an interface to one or more suitable peripheral component interconnect ("PCI") devices coupled with ICH 140 through one or more PCI slot(s) 162 on a PCI bus and an interface to one or more suitable industry standard architecture ("ISA") devices coupled to ICH 140 by the PCI bus through ISA bridge 164. ISA bridge 164 interfaces with one or more ISA devices through one or more ISA slot(s) 166 on an ISA bus.

ICH 140 is also coupled with FWH 170 to provide an interface to FWH 170. FWH 170 may comprise any suitable interface controller to provide for any suitable communication link to ICH 140. FWH 170 for one embodiment may share at least a portion of the interface between ICH 140 and super I/O controller 150. FWH 170 comprises a basic input/output system ("BIOS") memory 172 to store suitable system and/or video BIOS software. BIOS memory 172 may comprise any suitable non-volatile memory, for example, a flash memory.

Additionally, host 100 includes enhanced host controller interface unit 114. In an embodiment enhanced host controller interface unit 114 includes host controller unit 112, which is coupled with processor bus 110. In another embodiment, host controller unit 112 is a PCI device that is coupled with the PCI bus. In an embodiment, host controller unit 112 is a USB 2.0 host controller. Enhanced host controller interface unit 114 can provide a hardware/software interface between software executing within system 100 and host controller unit 114. In an embodiment, host controller unit 112 can transmit bits of data to and receive bits of data from high-, full-, and low-speed remote devices through USB port(s) 144.

Accordingly, host 100 includes a machine-readable medium on which is stored a set of instructions (i.e., software) embodying any one, or all, of the methodologies described above. For example, software can reside, completely or at least partially, within main memory 132 and/or within processors 102 and 104. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, and electrical, optical, acoustical, or other form of propagated signals (e.g., carrier waves, infrared signals, digital signals, etc.) etc.

Description of the Relationship Between Host 100 and Hub 202

Figure 2:
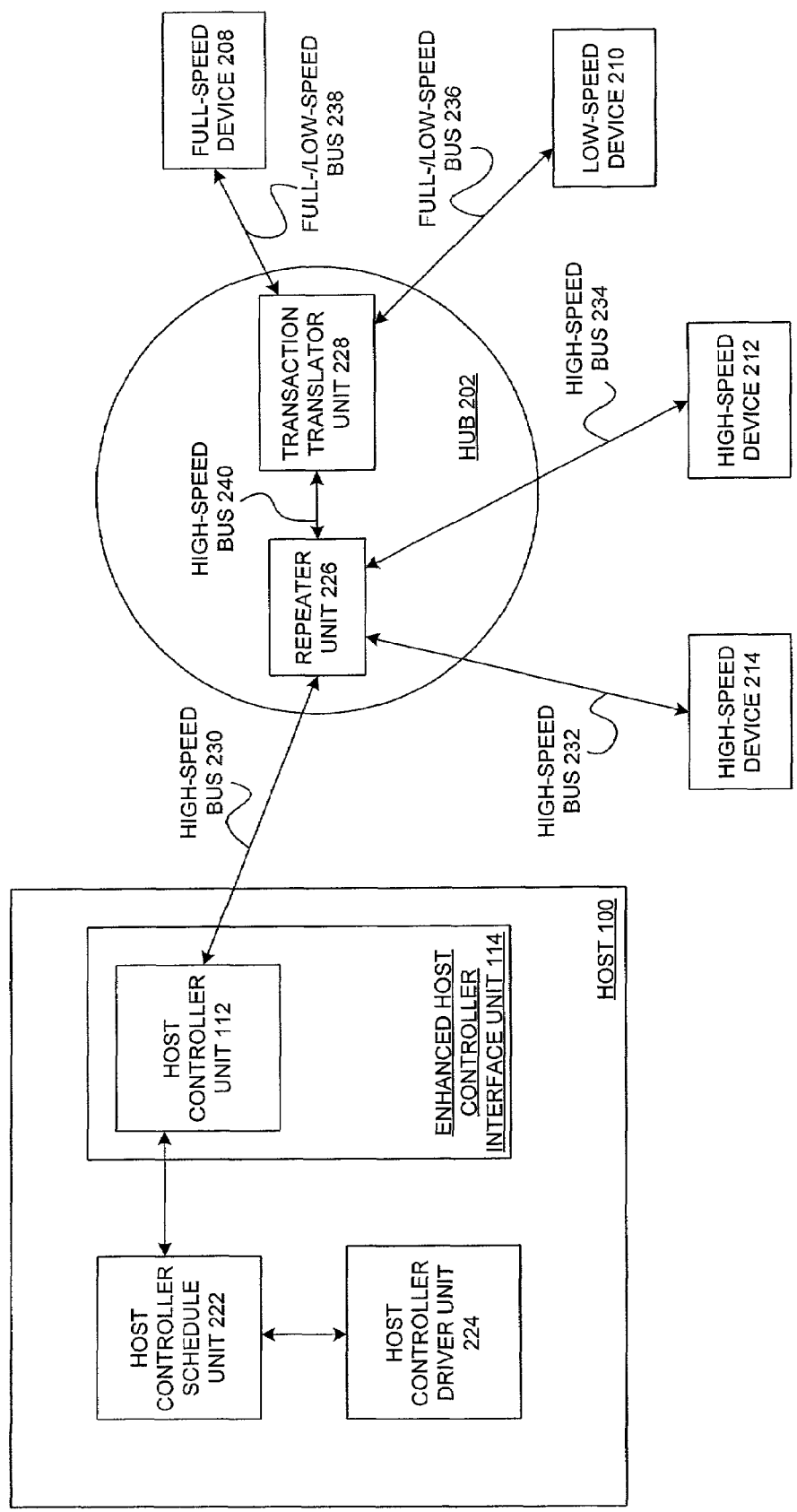
FIG. 2 is a diagram illustrating the relationship between host 100 and hub 202, according to embodiments of the present invention.

FIG. 2 is a diagram illustrating the relationship between host 100 and hub 202, according to embodiments of the present invention. As shown, host 100 includes host controller unit 112, enhanced host controller interface unit 114, host controller driver unit 224, and host controller schedule unit 222, such that enhanced host controller interface unit 114 comprises host controller unit 112, and such that host controller unit 112 is coupled with high-speed bus 230 and host controller schedule unit 222. In an embodiment, host controller driver unit 224 is a software layer between host controller unit 112 and high-speed bus 230. Host controller schedule unit 222 is described in more detail in connection with FIG. 3A (below).

Hub 202 comprises repeater unit 226 and transaction translator unit 228, such that repeater unit 226 is coupled with transaction translator unit 228 via high-speed bus 240. In an embodiment, repeater unit 226 is coupled with host controller unit 112, high-speed device 214, and high-speed device 212, via high-speed busses 230, 232, and 234, respectively. In an embodiment, high-speed busses 230, 232, 234, and 240 are busses operating in a high-speed signaling environment that follow the USB 2.0 standard, which can transmit data at 480 Mbps. In an embodiment, high-speed devices 214 and 212 are a video camera and an external hard drive, respectively; however, embodiments of the present invention are not so limited, as other embodiments may comprise different types of high-speed remote devices. In an embodiment, transaction translator unit 228 is coupled with full-speed device 208 and low-speed device 210, via full-/low-speed busses 238 and 236 respectively. In an embodiment, full-/low-speed busses 238 and 236 are busses operating in a full-/low-speed signaling environment that follow the USB 1.1 standard, which can transmit data at 1.5 Mbps (for low-speed devices) and 12 Mbps (for full-speed devices). In an embodiment, full-speed device 208 is a flash reader, and low-speed device 210 is a mouse; however, embodiments of the present invention are not so limited, as other embodiments may comprise different types of full- and low-speed remote devices.

Transaction translator unit 228 includes the mechanisms that support full- and low-speed remote devices behind hub 202, while transmitting remote device data between host 100 and hub 202 at high-speed. In an embodiment, transaction translator unit 228 includes a number of buffers to store start- and complete-split transactions transmitted from host 100 to a remote device coupled with hub 202 (discussed in more detail below). In an embodiment, repeater unit 226 forwards high-speed signals to and from high-speed devices 214 and 212. Embodiments of the present invention are not limited to the number of high-, full-, and low-speed remote devices and busses as shown in FIG. 2, as any number of high-, full-, and low-speed remote devices and busses may be coupled with hub 202 or host 100.

In an embodiment, host controller unit 112 transmits bits of data from host 100 to transaction translator unit 228 (intended for full-speed device 208 and low-speed device 210), via high-speed busses 230 and 240. In a further embodiment, the bits of data represent the execution of an endpoint, i.e., a particular transaction with one of the remote devices. Transaction translator unit 228 transmits these bits of data to the appropriate remote device, e.g., full-speed device 208 or low-speed device 210. The remote device can transmit bits representing the further execution of the endpoint to transaction translator unit 228 via a full-/low-speed bus. Transaction translator unit 228 can transmit those bits to host 100 via high-speed busses 240 and 230. In another embodiment, a remote device, such as full-speed device 208 or low-speed device 210, transmits bit of data to transaction translator unit 228 via a full-/low-speed bus. Transaction translator unit 228 then transmits the bits of data to host 100 via high-speed busses 240 and 230. Host 100 can transmit bits representing the further execution of the endpoint to transaction translator unit 228 via high-speed busses 230 and 240. Transaction translator can transmit those bits to the remote device via a full-/low-speed bus.

Figure 3A:
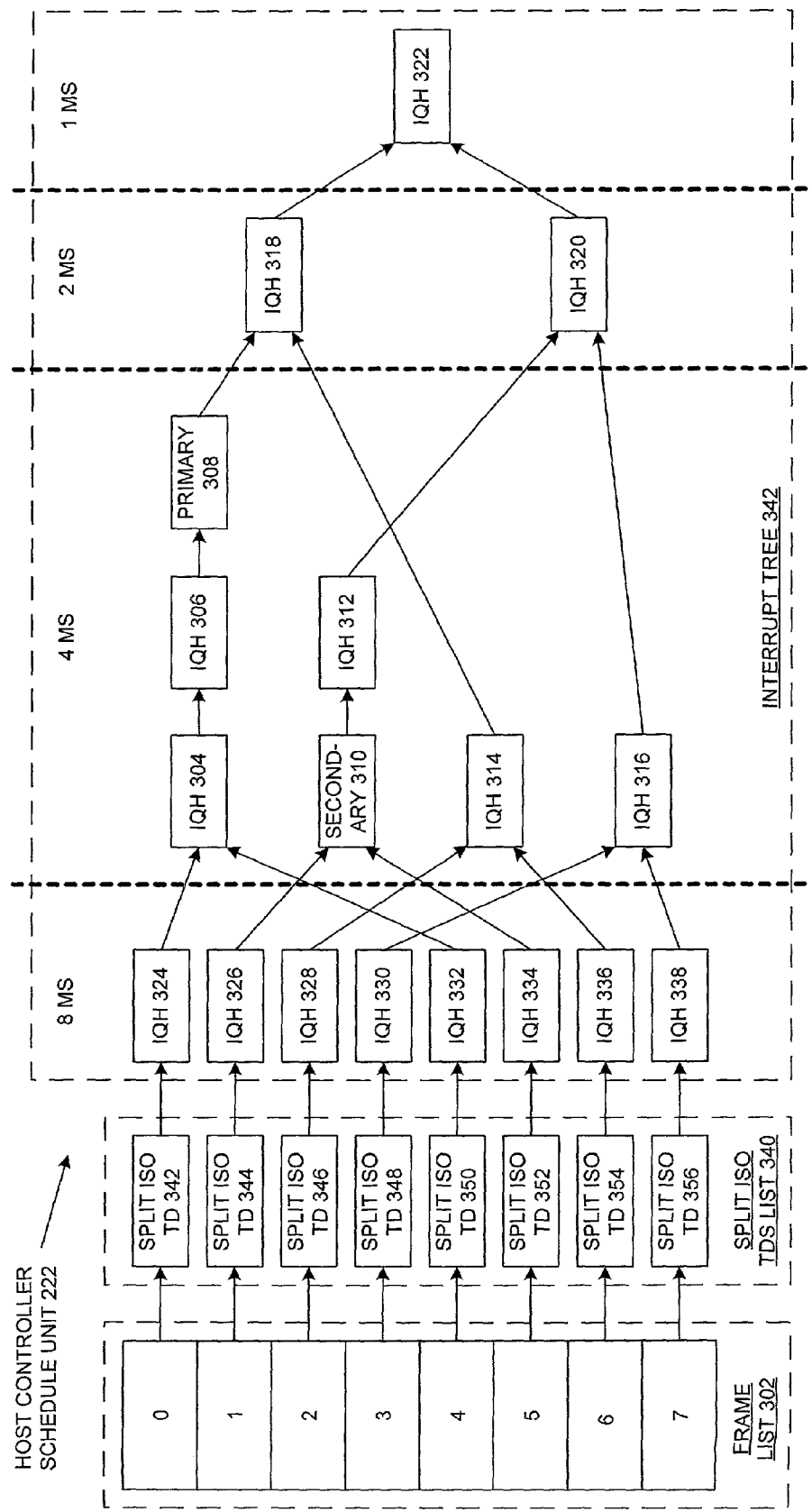
FIG. 3A illustrates portions of host controller schedule unit 222, according to embodiments of the present invention.

FIG. 3A illustrates portions of host controller schedule unit 222, according to embodiments of the present invention. In particular, host controller schedule unit 222 comprises frame list 302, split ISO TDs list 340, and interrupt tree 342 (delineated by the dashed lines around each of them). In an embodiment, frame list 302 is the root of periodic (isochronous and interrupt transfer types) transactions executed by host controller unit 112. Specifically, frame list 302 is a data register of pointers, the length of which being programmable by host controller driver unit 224. In an embodiment as illustrated, frame list 302 comprises eight pointers, numbered zero through seven, each corresponding to a particular frame. The pointers direct host controller unit 112 to the first work item in each frame's periodic schedule. In an embodiment, host controller unit 112 traverses host controller schedule unit 222 eight times per frame (each of the eight times, a "micro-frame"), executing transactions within the frame as it comes upon them. In an embodiment as illustrated, host controller unit 112 traverses host controller schedule unit 222 according to the directions of the arrows. For example, in frame zero, host controller unit 112 first executes split ISO TD 342, then IQH 324, then IQH 304, then IQH 306, etc., ending at IQH 322. Host controller unit 112 repeats that progression once per micro-frame.

Split ISO TDs list 340 is a list of split isochronous transfer descriptors ("split ISO TDs") that are executed by host controller unit 112 before interrupt endpoints within a particular micro-frame. Examples of remote devices requiring split ISO TDs transactions are USB cameras and speakers behind a hub; however embodiments of the present invention are not so limited, as a different type of remote device may require split ISO TDs transactions. As illustrated, split ISO TDs list 340 includes split ISO TDs 342–356, which stem from frames 0–7 in frame list 302, respectively.

In an embodiment, interrupt tree 342 is a data structure comprising interrupt queue heads ("IQHs") 304–338. Primary 308 and secondary 310 are also interrupt queue heads included within interrupt tree 342, and are discussed in more detail in connection with FIGS. 5–9 below. Interrupt tree 342 is created by host controller driver unit 224 to schedule particular IQHs for execution by host controller unit 112 according to their period. Each IQH corresponds to a particular endpoint, which represents a transaction with a remote device, e.g., full-speed device 208 in FIG. 2. Each IQH is scheduled in interrupt tree 342 according to its period of service (each period being separated by vertical, dashed lines in FIG. 3A). The period of service for each IQH (e.g., 1, 2, 4, 8, 16, . . . 225 Ms) is defined by the pattern of access by host controller unit 112. For example, IQH 322, having a period of 1 Ms, gets visited by host controller unit 112 during each frame; IQHs 318 and 320, having a period of 2 Ms, each get visited by host controller unit 112 during every other frame. However, embodiments of the present invention are not so limited, as different IQHs may have different periods. Each time host controller unit 112 visits an IQH, host controller unit 112 may issue another request to the remote device.

Because of the difference in speed between the high-speed and full-/low-speed busses, transaction translator unit 228 requires multiple transactions on the high-speed busses to complete a single transaction on a full-/low-speed bus. These transactions, depending on the position in interrupt tree 342, may require host controller unit 112 to visit an IQH in consecutive frames. Currently, the only position in interrupt tree 342 that is accessible from consecutive frames is the position at period one (e.g., IQH 322 is scheduled in period one). In such a situation, host controller driver unit 224 may promote the IQH to period one. When an IQH is promoted to period one, i.e., period promotion, it consumes at least N times more bandwidth than when operating at its normal period (where N is the normal period of the device, for example 8). This increased bandwidth usage limits the number of remote devices that can operate behind transaction translator unit 228. This can result in common remote devices, like conferencing cameras, speakers, keyboards, and mice, not working.

Figure 3B:
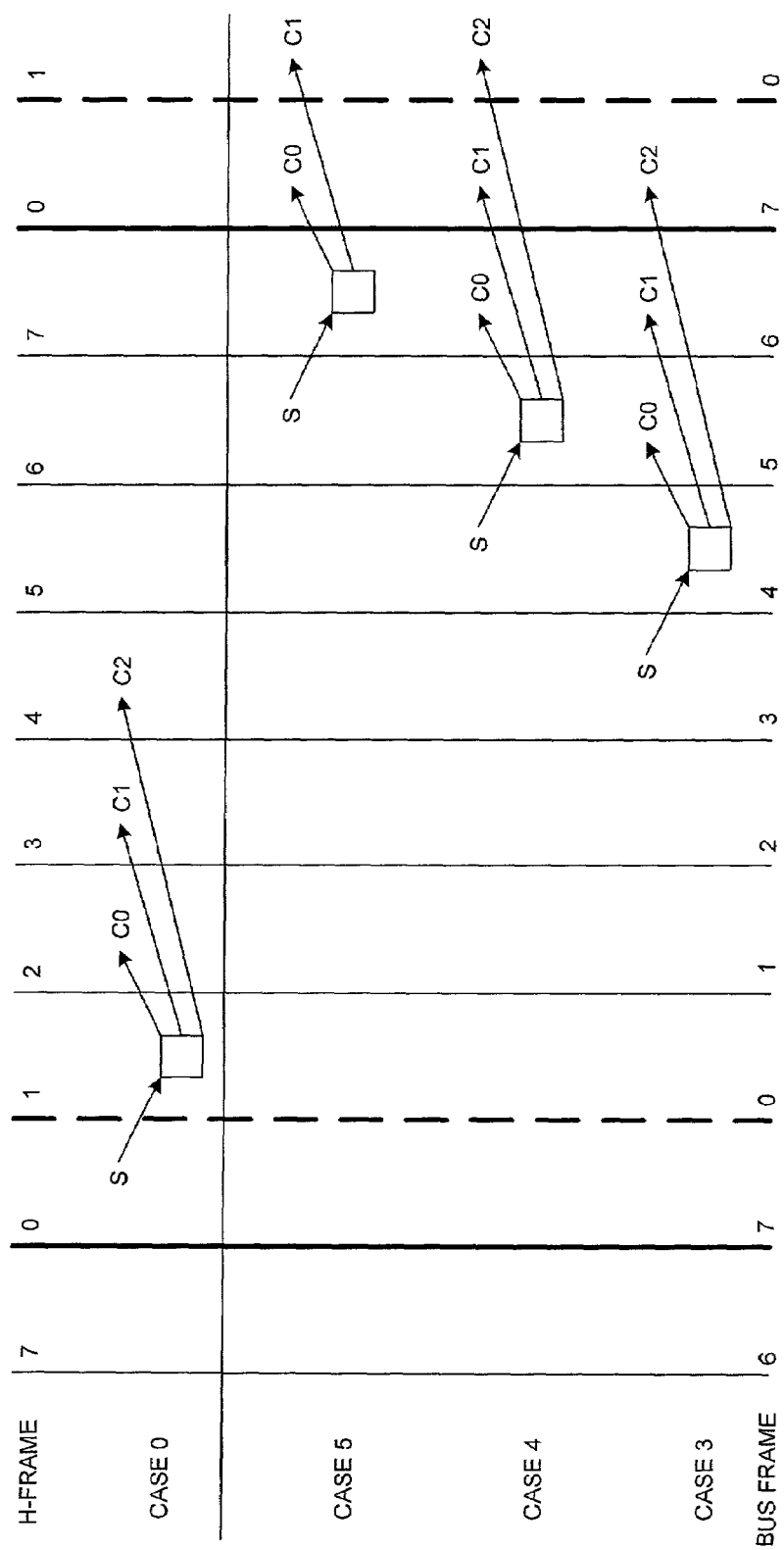
FIG. 3B illustrates several examples of high-speed split transactions, according to embodiments of the present invention.

FIG. 3B illustrates several examples of high-speed slit transactions, according to embodiments of the present invention. In the USB 2.0 standard, high-speed split transactions are used between host controller unit 112 and hub 202 when hub 202 has full/low-speed devices attached to it. This approach allows host controller unit 112 to start a full-/low-speed transaction using a high-speed transaction and then continue with other high-speed transactions without having to wait for the full-/low-speed transaction to proceed/complete at the slower speed. This high-speed split transaction is used to initiate a full-/low-speed transaction with a full-/low-speed device via hub 202. The high-speed split transaction also allows the completion status of the full-/low-speed transaction to be retrieved from transaction translator unit 228. A high-speed split transaction has two parts: a start-split and a complete-split. In an embodiment, split transactions are defined to be used between host controller unit 112 and transaction translator unit 228.

For example, for a high-speed endpoint, host controller unit 112 will visit an IQH, execute a high-speed transaction (if criteria are met), and advance the transfer state (or not), depending on the results of the entire transaction. For full-/low-speed endpoints, the details of the execution phase are different, i.e., it takes more than one bus transaction to complete, but the remainder of the operational framework is intact. This means that the transfer advancement, etc. occurs on the completion of a split transaction. For example, in a first micro-frame, host controller unit 112 can issue one start-split, wait one micro-frame, and issue three complete-splits in three subsequent micro-frames.

FIG. 3B illustrates four examples of high-speed split transactions, any of which could occur for a full-/low-speed IQH (e.g., IQH 304) depending on how the IQH is scheduled within a frame. In an embodiment, host controller unit 112 is required to implement a one micro-frame phase shift for its view of frame boundaries, in order to reduce the complexity for hardware and software. Host controller 112's view of a micro-frame is call an H-frame. The high-speed busses' view of the same micro-frame is called a bus frame (or B-frame). As a result, bus frames and H-frames have a fixed relationship, i.e., bus frames lag H-frames by one micro-frame.

Specifically, FIG. 3B illustrates eight micro-frames, the relationship between bus frames and H-frames, and also illustrates four examples of scheduled high-speed transactions: case zero and cases three through five. In case zero, the high-speed transaction begins in bus frame seven (denoted by 'S' for the start-split), waits for one bus frame (bus frame zero, denoted by the empty square), and then issues three complete-splits (denoted by 'C0,' 'C1,' and 'C2') in bus frames one, two, and three, respectively. In such a case, there is no need for a split transaction because the transaction is able to complete within a single frame (i.e., from H-frame zero through four). In another embodiment, a high-speed transaction could complete within a single frame when starting at bus frames one or two as well. For purposes of discussion, a frame follows the perspective of the H-frames as illustrated in FIG. 3B, i.e., H-frames zero through seven, which correspond to bus frames seven through six.

In cases three through five, where the high-speed transaction is scheduled to begin at bus frames three through five, respectively, the final complete-split necessary to ensure completion of the transaction is not guaranteed to be issued within the frame (H-frame zero of the next frame in case three; H-frame one of the next frame in case four; and H-frame two of the next frame (not pictured) in case five).

When transaction translator unit 228 receives an interrupt start-split transaction, it stores the packet. In this fashion, transaction translator unit 228 accumulates some number of start-split transactions for a following micro-frame. At the beginning of the next micro-frame, these transactions are available to be issued by transaction translator unit 228 on a downstream full-/low-speed busses in the order that they were stored. Transaction translator unit 228 issues each transaction on a downstream facing full-/low-speed bus. The remote device responds to the full-/low-speed transaction with an appropriate handshake, and transaction translator unit 112 stores the results of the transaction (in an embodiment: data, NAK, STALL, trans_err, etc.).

In the following micro-frames, host controller unit 112 issues high-speed complete-split transactions to retrieve the data/handshake from transaction translator unit 228. For an interrupt IN transaction, i.e., host controller unit 112 is requesting data from a remote device, when transaction translator unit 228 receives a complete-split transaction from host controller unit 112, it returns to host controller unit 112 whatever data it has received during a micro-frame. If the full-/low-speed transaction was started and completed in a single frame (i.e., begun in micro-frames 0–2), transaction translator unit 228 returns all of the data for the transaction in the complete-split response occurring in the following micro-frame. Previously, as discussed in connection with FIGS. 3A–B, no full-/low-speed interrupt transactions could span more than a single frame boundary using a single interrupt queue head. In other words, if the IQH was to be scheduled after micro-frame 2, it would need to be promoted to period one in order to complete the transaction in subsequent frames.

Interrupt OUT split transactions (i.e., host controller unit 112 is transmitting data to a remote device) are scheduled by host controller unit 112 as normal high-speed transactions with the start- and complete-splits scheduled as described previously. When there are several full-/low-speed transactions allocated for a given micro-frame, they are stored by transaction translator unit 228. The start-splits are saved in the order that they are received until the end of the micro-frame. At the end of the micro-frame, these transactions are available to be issued by transaction translator unit 228 on the full-/low-speed busses in the order that they were received.

In a following micro-frame, transaction translator unit 228 issues the transactions that had been stored on the downstream facing full-/low-speed busses. Some transactions could be leftover from a previous micro-frame because the high-speed schedule was built assuming best case bit stuffing, and the full-/low-speed transactions could be taking longer on the full-/low-speed busses. As transaction translator unit 228 issues transactions on the downstream facing full-/low-speed busses, it receives and stores the results in the periodic complete-split pipeline stage and then advances to the next transaction in the start-split pipeline. In a following micro-frame, host controller unit 112 issues a high-speed complete-split transaction and transaction translator unit 228 responds appropriately. FIGS. 5–9 (discussed below) illustrate a method for avoiding period promotion.

Figure 4:
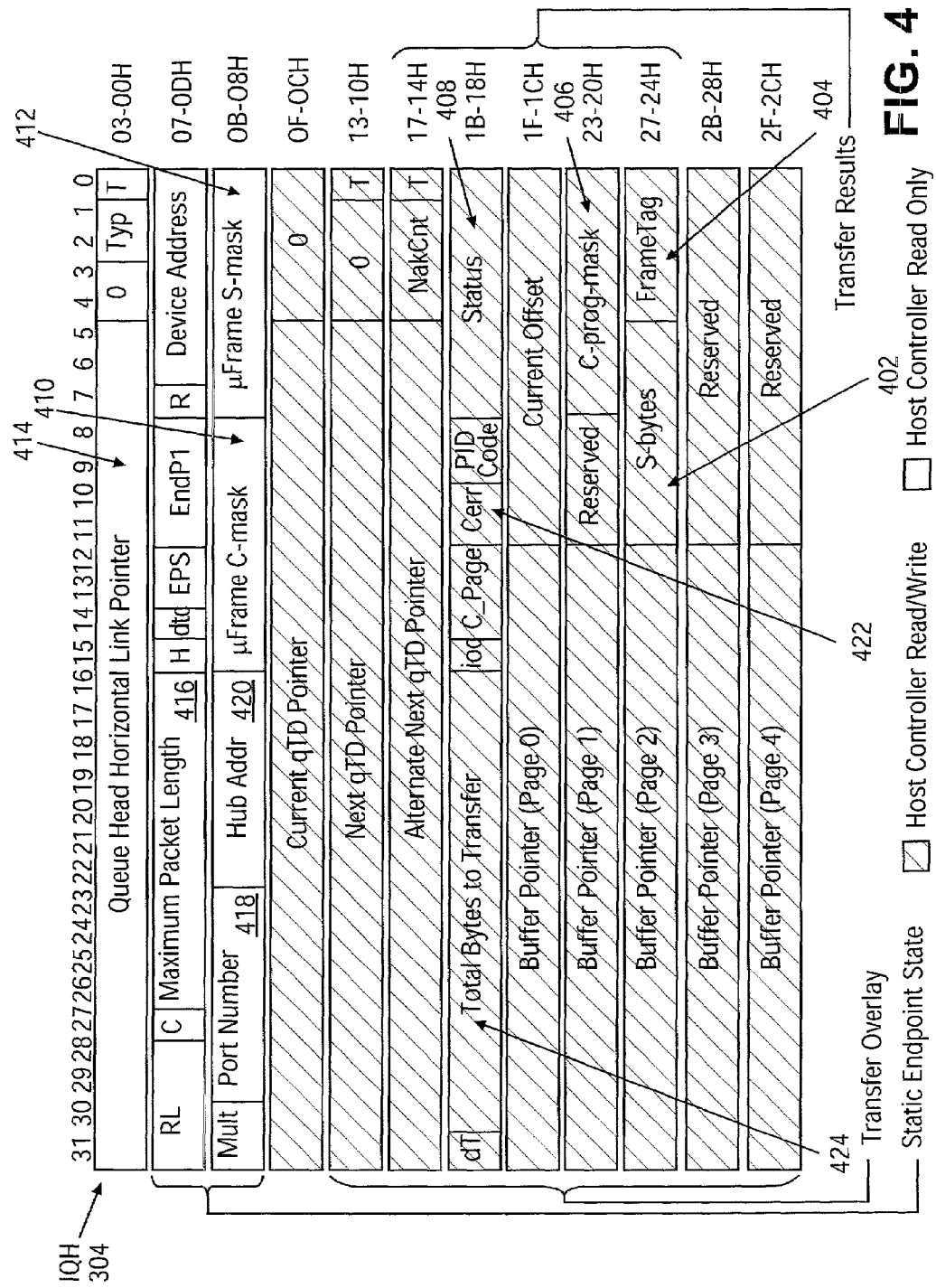
FIG. 4 illustrates a diagram of typical structure layout of an interrupt queue head, e.g., IQH 304, according to embodiments of the present invention.

FIG. 4 illustrates a diagram of a typical structure layout of an interrupt queue head, e.g., IQH 304, according to embodiments of the present invention. As explained in connection with FIG. 3A, IQH 304 is a data structure containing a number of fields. Specifically, field 414, Queue Head Horizontal Link Pointer, contains the physical memory address of the next IQH to be processed by host controller unit 112, e.g., IQH 306 as illustrated in FIG. 3A. Field 410, μFrame C-mask, is used to determine during which micro-frames host controller unit 112 should execute a complete-split transaction. Field 412, μFrame S-mask, is used to determine during which micro-frames host controller unit 112 should execute a start-split transaction. Field 416, Maximum Packet Length, indicates the maximum packet size of the associated endpoint. Field 418, Port Number, is the port number identifier on hub 202, below which the full-/low-speed remote device associated with the endpoint is attached. Field 420, Hub Addr(ess), is the remote device address of hub 202 below which the full-/low-speed remote device associated with the endpoint is attached. Field 408, Status, contains the status of the last transaction performed on IQH 304. In an embodiment, examples of states of the status field include: active (execution of transactions enabled), not active, halted (error), not halted, and SplitXState (which action to take next). Field 422, Cerr, is used to track the number of consecutive errors detected while executing the queue head. Field 424, Total Bytes to Transfer, specifies the total number of bytes to be moved with the IQH. This field is decremented by the number of bytes actually moved during the transaction, only on the successful completion of the transaction. Field 406, C-prog-mask, is used to track the progress of a complete-split transaction. Field 402, S-bytes, is used to track the number of bytes transmitted during an OUT transaction or accumulate the data bits received during an IN transaction. Field 404, FrameTag, is used 2 during the complete-split portion of the split transaction to tag the queue head with the frame number of when the next complete-split must be executed.

Operation of Host Controller Unit 112 and Host Controller Driver Unit 224

Figure 5:
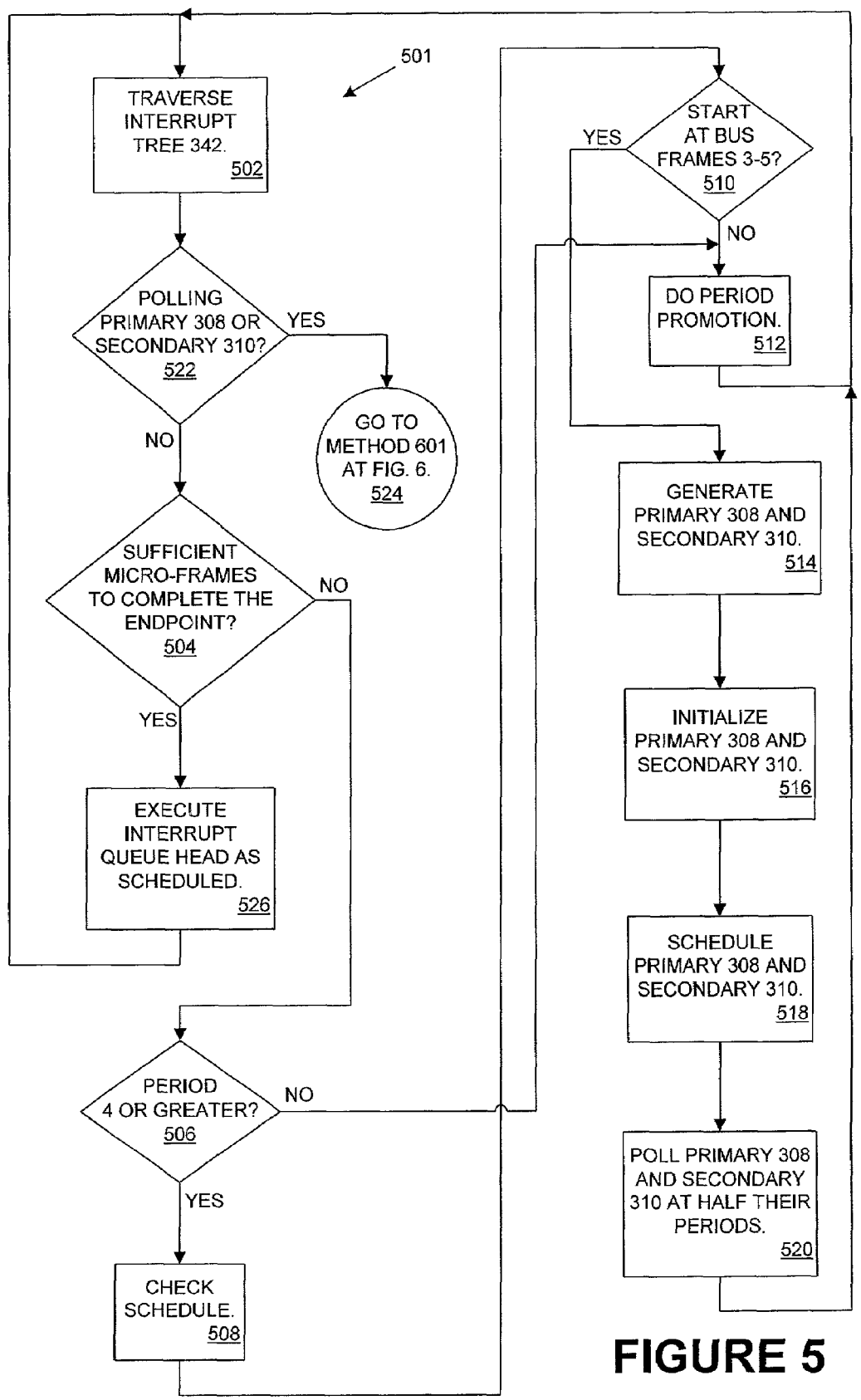
FIG. 5 illustrates a flow diagram of one embodiment for the generation, initialization, and scheduling of two interrupt queue heads to represent a single interrupt endpoint, according to embodiments of the present invention.

Certain operations of host controller unit 112 and host controller driver unit 224 will now be described in conjunction with the flow diagrams of FIGS. 5–9. For purposes of simplicity and not by way of limitation, communication with only one remote device, i.e., full-speed device 208 as depicted in FIG. 2, will be discussed. FIG. 5 illustrates a flow diagram of one embodiment for the generation, initialization, and scheduling of two interrupt queue heads to represent a single interrupt endpoint, according to embodiments of the present invention. Specifically, FIG. 5 illustrates a flow diagram for the generations, initialization, and scheduling at primary 308 and secondary 310.

Flow diagram 501 of FIG. 5 commences with host controller driver unit 224 traversing interrupt tree 342 and polling IQHs as it visits them, at process block 502. Host controller unit 112 polls the IQHs at fixed intervals, i.e., the period of each IQH, to determine the state of the IQH and whether a transaction should be executed. In an embodiment, some of the IQHs represent high-speed endpoints, while others represent full-/low-speed endpoints. At decision block 522, host controller driver unit 224 determines whether it is polling primary 308 or secondary 310. Although not created by host controller driver unit 224 in flow diagram 501 until process block 514, primary 308 and secondary 310 may already exist in another embodiment. If host controller driver unit 224 is polling primary 308 or secondary 310, the process shifts to flow diagram 601 at FIG. 6, at cross-reference block 524.

If not, host controller driver unit 224 determines whether the IQH being polled has sufficient micro-frames available to complete the endpoint that it represents, at decision block 504. If so, host controller unit 112 will execute the IQH as scheduled when host controller unit 112 next visits the IQH, at process block 526, the flow diagram then returns to process block 502, and the process repeats itself. In an embodiment, split ISO TDs 342–356 (as illustrated in FIG. 3) alter the number of micro-frames available for the IQHs because they must be executed first in a particular micro-frame. In another embodiment, no split ISO TDs are present within host controller schedule unit 222. If there are not sufficient micro-frames to complete the endpoint that the IQH represents (as determined at decision block 504), then host controller unit 112 determines whether the IQH is scheduled for polling at period 4 or greater, at decision block 506.

If the IQH is not scheduled to be polled at period 4 or greater, then host controller driver unit 224 shifts to process block 512 and promotes the period of the IQH to period one, so that it may be polled during each frame of host controller schedule unit 222. Period promotion accomplishes the task of enabling an IQH to be executed and polled at every frame, but it consumes a large amount of bandwidth to promote a low-speed device to period one (as discussed in connection with FIG. 3A). If the IQH is scheduled to be polled at period 4 or greater, then host controller driver unit 224 checks the scheduling of the IQH in interrupt tree 342 at process block 508. At decision block 510, host controller driver unit 224 determines whether the IQH is scheduled to begin at bus frames 3 through 5. If the IQH is not scheduled to begin at bus frames 3–5 (i.e., scheduled at bus frame 6 or 7, because being scheduled at bus frames 0 through 2 would not require multiple frames at decision block 504), then host controller driver unit 224 promotes the IQH to period one, at process block 512.

If the IQH is scheduled to begin at bus frames 3–5, then host controller driver unit 224 generates primary 308 and secondary 310, each an IQH (as discussed in connection with FIG. 3), to replace the single IQH that requires multiple frames for completion. In an embodiment, primary 308 and secondary 310 are both to represent a single interrupt endpoint, for example, one that is associated with full-speed device 208 or low-speed device 210. However, embodiments of the present invention are not so limited, as the single interrupt endpoint may represent other full-/low-speed remote devices. In an embodiment where the endpoint transaction is to begin at bus frame 3, primary 308 is to do one start-split and two complete-splits, and secondary 310 is to do one complete-split. In another embodiment where the endpoint transaction is to begin at bus frame 4, primary 308 is to do one start-split and one complete-split, and secondary 310 is to do two complete-splits. In a further embodiment where the endpoint transaction is to begin at bus frame 5, primary 308 is to do one start-split, and secondary 310 is to do two complete-splits.

At process block 516, host controller driver unit 224 initializes primary 308 and secondary 310. In an embodiment, host controller driver unit 224 sets the fields in primary 308 and secondary 310 to do a predetermined number of start- and complete-splits, depending on their start position. At process block 518, host controller driver unit 224 schedules primary 308 and secondary 310 in interrupt tree 342 such that primary 308 is to begin at and continue through the end of a set of micro-frames, and such that secondary 310 is to begin at the first micro-frame in the immediately subsequent frame. In an embodiment, split ISO TDs may be present within host controller schedule unit 222, which require host controller unit 112 to visit them first in a particular frame. In such an embodiment, secondary 310 is scheduled at the first micro-frame subsequent to the split ISO TD. At process block 520, host controller driver unit 224 sets primary 308 and secondary 310 to be polled at one-half their periods. Host controller driver unit 224 then executes process block 502, and repeats flow diagram 501.

Figure 6:
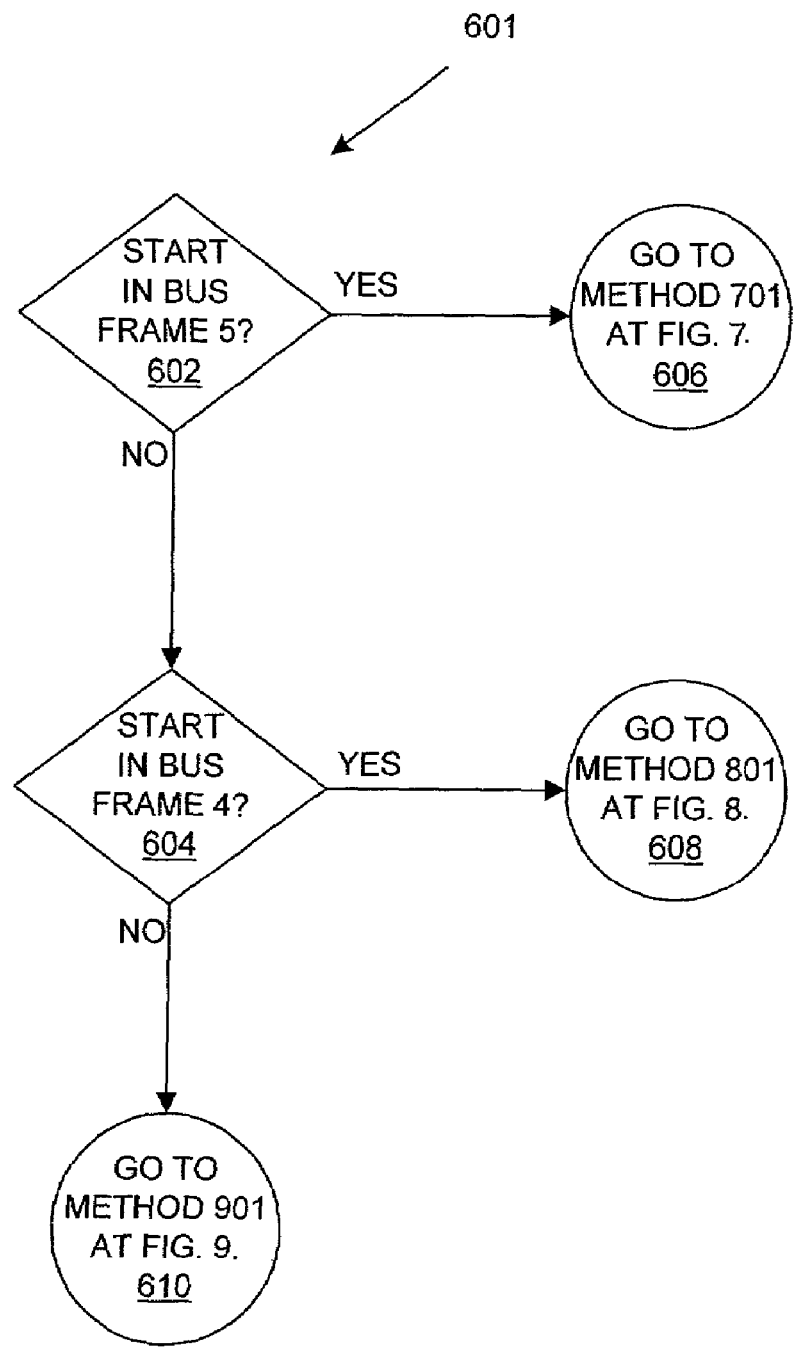
FIG. 6 illustrates a flow diagram for determining which other flow diagram to execute, depending on the bus frame in which primary 308 is to begin, according to embodiments of the present invention.

FIG. 6 illustrates a flow diagram for determining which other flow diagram to execute, depending on the bus frame in which primary 308 is to begin, according to embodiments of the present invention. It is necessary to poll primary 308 and secondary 310 differently, depending on how they are initialized and executed, because the states of primary 308 and secondary 310 may differ depending on whether either has executed a complete-split, whether either has been corrupted, etc. Flow diagram of FIG. 6 commences with host controller unit 112 determining whether primary 308 is to begin in bus frame 5, at decision block 602. If so, the process shifts to flow diagram 701 at FIG. 7, at cross-reference block 606. If not, host controller unit 112 determines whether primary 308 is to begin in bus frame 4, at decision block 604. If so, the process shifts to flow diagram 801 at FIG. 8, at cross-reference block 608. If not (primary 308 is to begin at bus frame 3), the process shifts to flow diagram 901 at FIG. 9, at cross-reference block 610.

Figure 7:
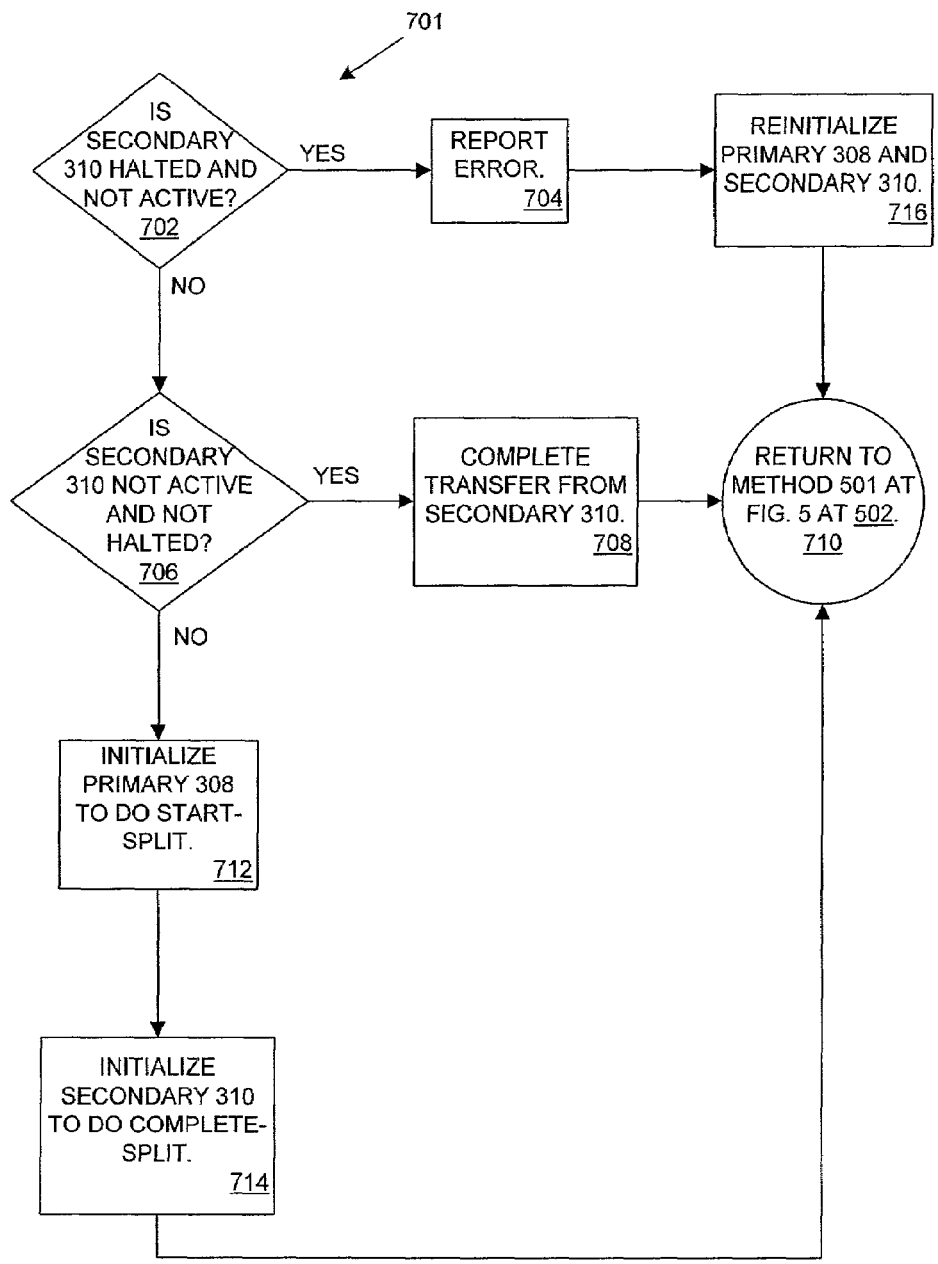
FIG. 7 illustrates a flow diagram of an embodiment for the polling of two interrupt queue heads, that relate to a single interrupt endpoint, according to embodiments of the present invention.

FIG. 7 illustrates a flow diagram of an embodiment for the polling of two interrupt queue heads that relate to a single interrupt endpoint, according to embodiments of the present invention. Specifically, FIG. 7 illustrates a flow chart for the embodiment where primary 308 begins in bus frame 5. Flow diagram 701 of FIG. 7 commences with host controller driver unit 224 determining whether secondary 310 is halted and not active, at process block 702. In an embodiment, to determine the status of secondary 310, host controller driver unit 224 reads the contents of field 408 within secondary 310. If secondary 310 is halted and not active, host controller driver unit 224 reports the presence of an error, at process block 704. Host controller driver unit 224 then reinitializes primary 308 and secondary 310, at process block 716. In an embodiment, host controller driver unit 224 reinitializes primary 308 and secondary 310 to their original states. The process then executes flow diagram 501 of FIG. 5 at block 502, at cross-reference block 710. Otherwise, host controller driver unit 224 executes decision block 706.

At decision block 706, host controller driver unit 224 determines whether secondary 310 is not active and not halted. If secondary 310 is not active and not halted, host controller driver unit 224 completes the transaction from secondary 310, at process block 708, and continues processing at flow diagram 501 of FIG. 5 at block 502, at cross-reference block 710. Otherwise, at process block 712, host controller driver unit 224 initializes primary 308 to do a start-split when next visited by host controller driver unit 224, and host controller driver unit 224 sets fields 404 (Frame Tag) and 406 (C-prog-mask) to zero. At process block 714, host controller driver unit 224 initializes secondary 310 to do a complete-split when next visited by host controller driver unit 224, and sets field 406 (C-prog-mask) to zero. Host controller driver unit 224 continues processing at flow diagram 501 of FIG. 5 at block 502, at cross-reference block 710.

Figure 8:
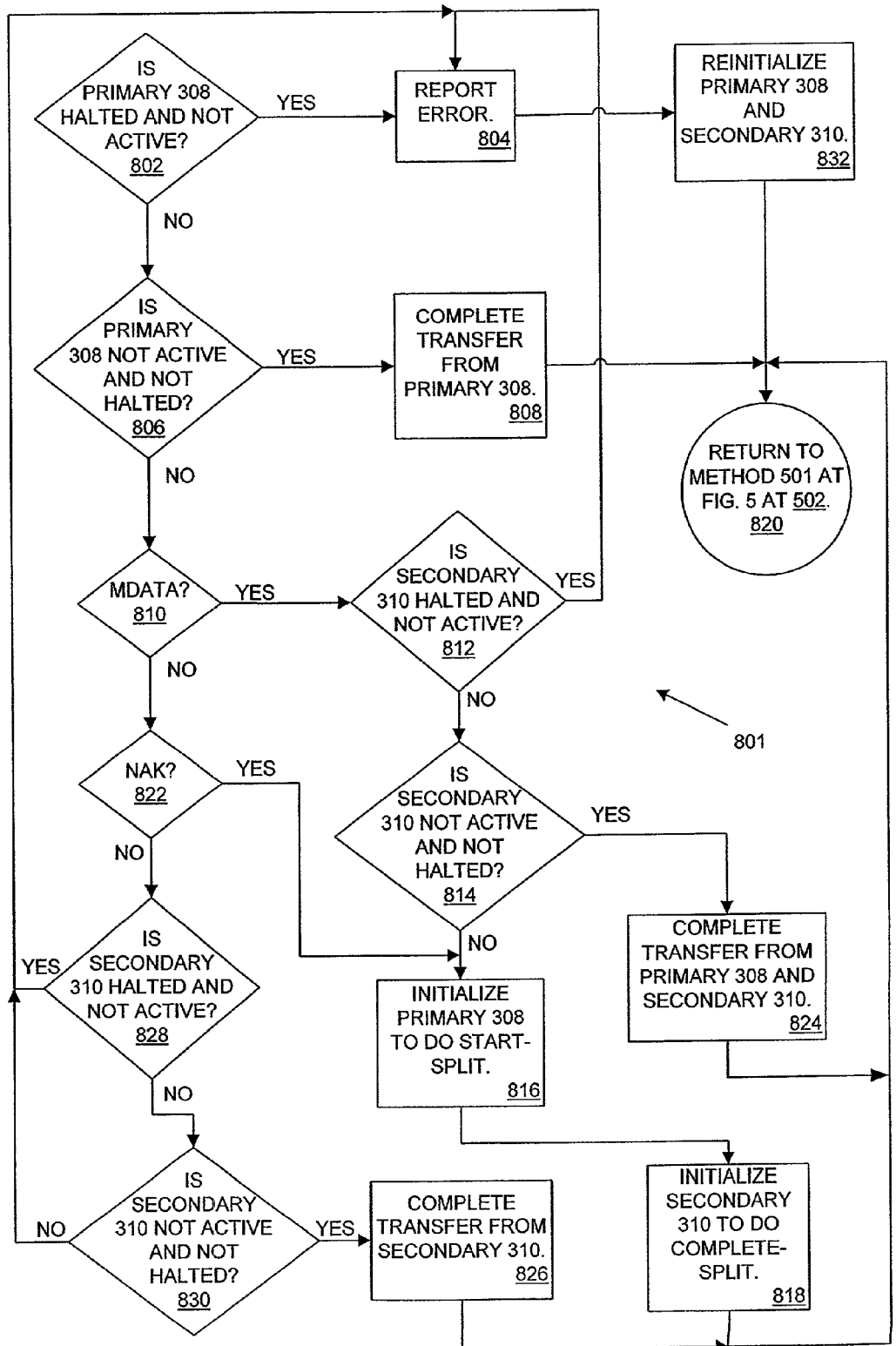
FIG. 8 illustrates a flow diagram of another embodiment for the polling of two interrupt queue heads that relate to a single interrupt endpoint, according to embodiments of the present invention.

FIG. 8 illustrates a flow diagram of another embodiment for the polling of two interrupt queue heads that relate to a single interrupt endpoint, according to embodiments of the present invention. Specifically, FIG. 8 illustrates a flow diagram for the embodiment where primary 308 begins in bus frame 4. Flow diagram 801 of FIG. 8 commences with host controller driver unit 224 determining whether primary 308 is halted and not active, at process block 802. In an embodiment, host controller driver unit 224 reads the contents of field 408 within primary 308. If primary 308 is halted and not active, an error in the split transaction has occurred, and host controller driver unit 224 reports the presence of an error, at process block 804. Host controller driver unit 224 then reinitializes primary 308 and secondary 310, at process block 832. In an embodiment, host controller driver unit 224 reinitializes primary 308 and secondary 310 to their original states. The process then continues processing at flow diagram 501 of FIG. 5 at block 502, at cross-reference block 820. Otherwise, host controller driver unit 224 continues processing at decision block 806.

At decision block 806, host controller driver unit 224 determines whether primary 308 is not active and not halted. If primary 308 is not active and not halted, host controller unit 112 completes the transaction from primary 308 as scheduled, at process block 808, and host controller driver unit 224 continues processing at flow diagram 501 of FIG. 5 at block 502, at cross-reference block 820. Otherwise, host controller driver unit 224 continues processing at decision block 810. At decision block 810, host controller driver unit 224 checks for the presence of an MDATA. In an embodiment, transaction translator unit 228 responds to a start- or complete-split transaction from hub controller unit 112 with a signal indicating the presence of an MDATA. In such an embodiment, host controller unit 112 sets the active bit in field 408 (status) of primary 308 to one, sets the SplitXState bit in field 408 of primary 308 to do a complete-split, and sets field 424 (Total Bytes to Transfer) of primary 308 to its initial value. Upon reading such a pattern of bits in primary 308, host controller driver unit 224 can discern the presence of an MDATA. If an MDATA exists, host controller driver unit 224 determines whether secondary 310 is halted and not active, at decision block 812. If secondary 310 is halted and not active, host controller driver unit 224 continues processing at to process block 804. Otherwise, host controller driver unit 224 determines whether secondary 310 is not active and not halted, at decision block 814. If secondary 310 is not active and not halted, host controller unit 112 completes the transaction from primary 308 and secondary 310 as scheduled, at process block 824, and host controller driver unit 224 continues processing at flow diagram 501 of FIG. 5 at block 502, at cross-reference block 820. Otherwise, host controller driver unit 224 initializes primary 308 to do a start-split, at process block 816. Host controller driver unit 224 then initializes secondary 310 to do a complete-split, at process block 818, and then continues processing at flow diagram 501 of FIG. 5 at block 502, at cross-reference block 820.

If host controller driver unit 224 does not detect an MDATA at decision block 810, it checks for the presence of a NAK, at decision block 822. In an embodiment, transaction translator unit 228 responds to a start- or complete-split transaction from hub controller unit 112 with a signal indicating the presence of a NAK. In such an embodiment, host controller unit 112 sets the active bit in field 408 (status) of primary 308 to one, sets the SplitXState bit in field 408 of primary 308 to do a complete-split, and sets field 424 (Total Bytes to Transfer) of primary 308 to its initial value. Upon reading such a pattern of bits in primary 308, host controller driver unit 224 can discern the presence of an NAK. If a NAK exists, host controller driver unit 224 continues processing at process block 816. Otherwise, in an embodiment, the SplitXState bit in field 408 of primary 308 may be set to do a start-split in response to a NYET signal from transaction translator unit 228, and upon reading such a pattern of bits in primary 308, host controller driver unit 224 determines whether secondary 310 is halted and not active, at decision block 828. In an embodiment, if secondary 310 is halted and not active, host controller driver unit 224 continues processing at process block 804. Otherwise, host controller driver unit 224 determines whether secondary 310 is not active and not halted, at decision block 830. If secondary 310 is not active and not halted, host controller unit 112 completes the transaction from secondary 310 as scheduled, at process block 826, and host controller driver unit 224 continues processing at flow diagram 501 of FIG. 5 at block 502, at cross-reference block 820. Otherwise, host controller driver unit 224 continues processing at process block 804.

Figure 9:
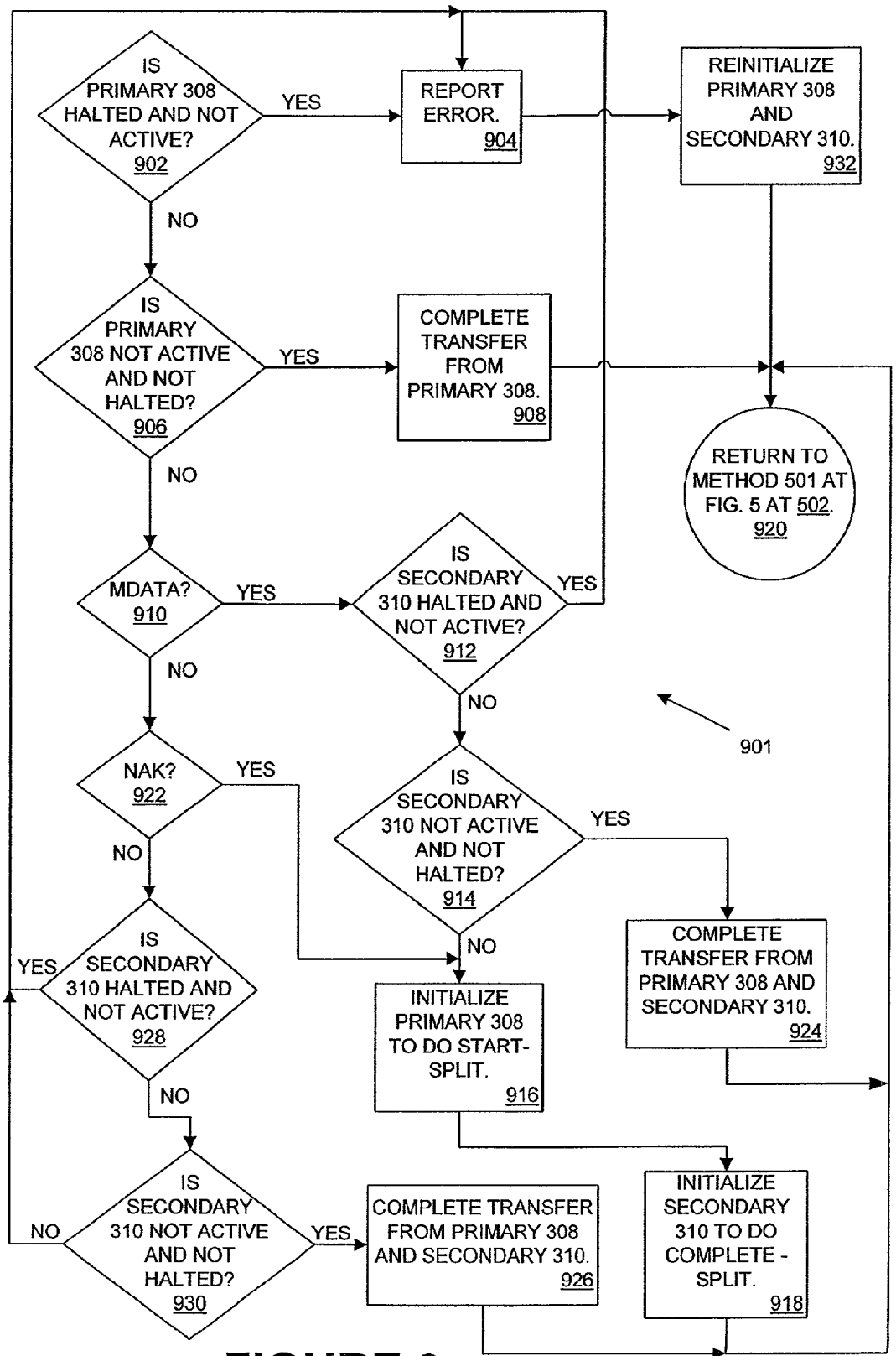
FIG. 9 illustrates a flow diagram of another embodiment for the polling of two interrupt queue heads that relate to a single interrupt endpoint, according to embodiments of the present invention.

FIG. 9 illustrates a flow diagram of another embodiment for the polling of two interrupt queue heads that relate to one interrupt endpoint, according to embodiments of the present invention. Specifically, FIG. 9 illustrates the embodiment where primary 308 begins in bus frame 3. Flow diagram 901 of FIG. 9 commences with host controller driver unit 224 determining whether primary 308 is halted and not active, at process block 902. In an embodiment, host controller driver unit 224 reads the contents of field 408 within primary 308. If primary 308 is halted and not active, host controller driver unit 224 reports the presence of an error, at process block 904. Host controller driver unit 224 reinitializes primary 308 and secondary 310, at process block 932. In an embodiment, host controller driver unit 224 reinitializes primary 308 and secondary 310 to their original states. The process then continues processing at flow diagram 501 of FIG. 5 at block 502, at cross-reference block 920. Otherwise, host controller driver unit 224 continues processing at decision block 906.

At decision block 906, host controller driver unit 224 determines whether primary 308 is not active and not halted. If primary 308 is not active and not halted, host controller unit 112 completes the transaction from primary 308 as scheduled, at process block 908, and host controller driver unit 224 continues processing at flow diagram 501 of FIG. 5 at block 502, at cross-reference block 920. Otherwise, host controller driver unit 224 continues processing at decision block 910. At decision block 910, host controller driver unit 224 checks for the presence of an MDATA. In an embodiment, transaction translator unit 228 responds to a start- or complete-split transaction from hub controller unit 112 with a signal indicating the presence of an MDATA. In such an embodiment, host controller unit 112 sets the active bit in field 408 (status) of primary 308 to one, sets the SplitXState bit in field 408 of primary 308 to do a complete-split, and sets field 424 (Total Bytes to Transfer) of primary 308 to its initial value. Upon reading such a pattern of bits in primary 308, host controller driver unit 224 can discern the presence of an MDATA. If an MDATA exists, host controller driver unit 224 determines whether secondary 310 is halted and not active, at decision block 912. If secondary 310 is halted and not active, host controller driver unit 224 executes process block 904. Otherwise, host controller driver unit 224 determines whether secondary 310 is not active and not halted, at decision block 914. If secondary 310 is not active and not halted, host controller unit 112 completes the transaction from primary 308 and secondary 310 as scheduled, at process block 924, and host controller driver unit 224 executes flow diagram 501 of FIG. 5 at block 502, at cross-reference block 920. Otherwise, host controller driver unit 224 initializes primary 308 to do a start-split, at process block 916. Host controller driver unit 224 then initializes secondary 310 to do a complete-split, at process block 918, and then executes to flow diagram 501 of FIG. 5 at block 502, at cross-reference block 920.

If host controller driver unit 224 does not detect an MDATA at decision block 910, it checks for the presence of a NAK, at decision block 922. In an embodiment, transaction translator unit 228 responds to a start- or complete-split transaction from hub controller unit 112 with a signal indicating the presence of a NAK. In such an embodiment, host controller unit 112 sets the active bit in field 408 (status) of primary 308 to one, sets the SplitXState bit in field 408 of primary 308 to do a start-split, and sets field 424 (Total Bytes to Transfer) of primary 308 to its initial value. Upon reading such a pattern of bits in primary 308, host controller driver unit 224 can discern the presence of an NAK. If a NAK exists, host controller driver unit 224 executes process block 916. Otherwise, in an embodiment, the SplitXState bit in field 408 of primary 308 may be set to do a complete-split in response to a NYET signal from transaction translator unit 228, and upon reading such a pattern of bits in primary 308, host controller driver unit 224 determines whether secondary 310 is halted and not active, at decision block 928. If secondary 310 is halted and not active, host controller driver unit 224 executes process block 904. Otherwise, host controller driver unit 224 determines whether secondary 310 is not active and not halted, at decision block 930. If secondary 310 is not active and not halted, host controller unit 112 completes the transaction from primary 308 and secondary 310 as scheduled, at process block 926, and host controller driver unit 224 executes flow diagram 501 of FIG. 5 at block 502, at cross-reference block 920. Otherwise, host controller driver unit 224 executes process block 904.

Generating, initializing, and scheduling two interrupt queue heads to represent a single full-/low-speed interrupt endpoint avoids costly period promotions. Previously, a full-/low-speed IQH that was scheduled late in a frame would have to be promoted to period one to ensure that its split transaction was completed properly. As discussed herein, using two IQHs (e.g., primary 308 and secondary 310) to represent a single full/low-speed endpoint permits scheduling of the high-speed split transaction in a greater range of bus frames, where it was limited to bus frames zero through two previously.

Thus, a method and apparatus for generating, initializing, and scheduling two interrupt queue heads to represent a single endpoint are described have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
   replacing a single queue head with a primary interrupt queue head and a secondary interrupt queue head, the primary and secondary interrupt queue heads to represent an endpoint, the endpoint to represent a transaction between a host and at least one remote device over a serial bus, wherein execution of the endpoint requires more than one frame, each frame comprising a plurality of micro-frames;
   initializing the primary and secondary interrupt queue heads; and
   scheduling the primary and secondary interrupt queue heads, wherein the primary interrupt queue head is positioned in a first micro-frame and wherein the secondary interrupt queue head is positioned in a second micro-frame, the second micro-frame being immediately subsequent to the first micro-frame.

2. The method of claim 1, wherein the generating of the primary and secondary interrupt queue heads is done when the execution of the endpoint is to begin in one of a third, fourth, or fifth micro-frame in the plurality of micro-frames.

3. The method of claim 1, wherein the initializing of the primary and secondary interrupt queue heads further comprises:
- initializing the primary interrupt queue head to perform one start split transaction; and
- initializing the secondary interrupt queue head to perform two complete split transactions.

4. The method of claim 1, wherein the initializing of the primary and secondary interrupt queue heads further comprises:
- initializing the primary interrupt queue head to perform one start split transaction and one complete split transaction; and
- initializing the secondary interrupt queue head to perform two complete split transactions.

5. The method of claim 1, wherein the initializing of the primary and secondary interrupt queue heads further comprises:
- initializing the primary interrupt queue head to perform one start split transaction and two complete split transactions; and
- initializing the secondary interrupt queue head to perform one complete split transaction.

6. The method of claim 1, further comprising reinitializing the primary and secondary interrupt queue heads.

7. The method of claim 1, wherein the at least one remote device is a full-speed or low-speed device.

8. The method of claim 1, further comprising polling the secondary interrupt queue head to determine the status of the secondary interrupt queue head.

9. The method of claim 1, further comprising polling the primary interrupt queue head to determine the status of the primary interrupt queue head.

10. A machine-readable medium that includes instructions, which when executed by a machine, causes the machine to perform a method, the method comprising:
- replacing a single queue head with a primary interrupt queue head and a secondary interrupt queue head, the primary and secondary interrupt queue heads to represent an endpoint, the endpoint to represent a transaction between a host and at least one remote device over a serial bus, wherein execution of the endpoint requires more than one frame, each frame comprising a plurality of micro-frames;
- initializing the primary and secondary interrupt queue heads; and
- scheduling the primary and secondary interrupt queue heads, wherein the primary interrupt queue head is positioned in a first micro-frame and wherein the secondary interrupt queue head is positioned in a second micro-frame, the second micro-frame being immediately subsequent to the first micro-frame.

11. The machine-readable medium of claim 10, wherein the generating of the primary and secondary interrupt queue heads is done when the execution of the endpoint is to begin in one of a third, fourth, or fifth micro-frame in the plurality of micro-frames.

12. The machine-readable medium of claim 10, wherein the initializing of the primary and secondary interrupt queue heads further comprises:
- initializing the primary interrupt queue head to perform one start split transaction; and
- initializing the secondary interrupt queue head to perform two complete split transactions.

13. The machine-readable medium of claim 10, wherein the initializing of the primary and secondary interrupt queue heads further comprises:
- initializing the primary interrupt queue head to perform one start split transaction and one complete split transaction; and
- initializing the secondary interrupt queue head to perform two complete split transactions.

14. The machine-readable medium of claim 10, wherein the initializing of the primary and secondary interrupt queue heads further comprises:
- initializing the primary interrupt queue head to perform one start split transaction and two complete split transactions; and
- initializing the secondary interrupt queue head to perform one complete split transaction.

15. The machine-readable medium of claim 10, further comprising reinitializing the primary and secondary interrupt queue heads.

16. The machine-readable medium of claim 10, wherein the at least one remote device is a full-speed or low-speed device.

17. The machine-readable medium of claim 10, further comprising polling the secondary interrupt queue head to determine the status of the secondary interrupt queue head.

18. The machine-readable medium of claim 10, further comprising polling the primary interrupt queue head to determine the status of the primary interrupt queue head.

19. An apparatus, comprising:
- a high-speed serial bus;
- a full-/low-speed serial bus;
- a hub, comprising:
  - a transaction translator unit, coupled with the high-speed serial bus and the full-/low-speed serial bus, to translate bits of data associated with an endpoint between a transfer rate associated with the high-speed serial bus and a transfer rate associated with the full-/low-speed serial bus;
- a high-speed host, comprising:
  - a host controller driver unit to replace a single queue head with a primary interrupt queue head and a secondary interrupt queue head, to initialize the primary interrupt queue head and the secondary interrupt queue head, and to schedule the primary interrupt queue head and the secondary interrupt queue head, the primary and secondary interrupt queue heads to represent the endpoint, the endpoint representing a transaction between the host and at the least one remote device, wherein execution of the endpoint requires more than one frame, each frame comprising a plurality of micro-frames; and
  - a host controller unit, coupled with the high-speed serial bus and the host controller driver unit, to transmit the bits of data associated with the endpoint to and receive the bits of data associated with the endpoint from at least one remote device,
- wherein the at least one remote device, coupled with the full-/low-speed serial bus, to transmit bits of data associated with the endpoint to and receive bits of data associated with the endpoint from the host controller unit.

20. The apparatus of claim 19, wherein the host controller driver unit is to schedule the primary and secondary interrupt queue heads such that the primary queue head is positioned in a first micro-frame and such that the secondary interrupt queue head is positioned in a second micro-frame, the second micro-frame being immediately subsequent to the first micro-frame.

21. The apparatus of claim 19, wherein the host controller driver unit is to generate the primary and secondary interrupt queue heads when the execution of the endpoint is to begin in one of a third, fourth, or fifth micro-frame in the plurality of micro-frames.

22. The apparatus of claim 19, wherein the host further comprises an enhanced host controller interface unit, which includes the host controller unit, the enhanced host controller interface unit to provide an interface between the host controller unit and the host controller driver unit.

23. A system, comprising:
a high-speed signaling environment;
a full-/low speed signaling environment;
a hub, wherein the hub is located within the high-speed signaling environment and the full-/low speed signaling environment, to translate bits of data associated with an endpoint between a transfer rate associated with the high-speed signaling environment and a transfer rate associated with the full-/low-speed signaling environment;
a high-speed host, located within the high-speed signaling environment, coupled with the hub, to transmit bits of data associated with the endpoint and to receive bits of data associated with the endpoint from at least one full-/low speed remote device, and to replace a single queue head with a primary interrupt queue head and a secondary interrupt queue head to initialize the primary interrupt queue head and the secondary interrupt queue head and to schedule the primary interrupt queue head and the secondary interrupt queue head, the primary and secondary interrupt queue heads to represent the endpoint, the endpoint representing a transaction between the host and at the least one remote device, wherein execution of the endpoint requires more than one frame, each frame comprising a plurality of micro-frames,
wherein the at least one full-/low speed remote device, coupled with the hub, to transmit bits of data to and receive bits of data from the host, wherein the at least one remote device is located within the full-/low-speed signaling environment.

24. The system of claim 23, wherein the host is to schedule the primary and secondary interrupt queue heads such that the primary interrupt queue head is positioned in a first micro-frame and such that the secondary interrupt queue head is positioned in a second micro-frame, the second micro-frame being immediately subsequent to the first frame.

25. The system of claim 23, wherein the host is to generate the primary and secondary interrupt queue heads when the execution of the endpoint is to begin in one of a third, fourth, or fifth micro-frame in the plurality of micro-frames.

* * * * *